(12) United States Patent
Chun et al.

(10) Patent No.: US 12,472,677 B2
(45) Date of Patent: Nov. 18, 2025

(54) LOW PROFILE PRODUCT EXTRACTOR FOR THERMOFORMED PRODUCTS

(71) Applicant: Brown LLC, Beaverton, MI (US)

(72) Inventors: Victor L. Chun, Beaverton, MI (US); Robert Abel, Beaverton, MI (US)

(73) Assignee: BROWN LLC, Beaverton, MI (US)

( * ) Notice: Subject to any disclaimer, the term of this patent is extended or adjusted under 35 U.S.C. 154(b) by 0 days.

(21) Appl. No.: 19/064,009

(22) Filed: Feb. 26, 2025

(65) Prior Publication Data

US 2025/0196429 A1 Jun. 19, 2025

Related U.S. Application Data

(62) Division of application No. 18/623,244, filed on Apr. 1, 2024, now Pat. No. 12,263,631.

(60) Provisional application No. 63/494,405, filed on Apr. 5, 2023.

(51) Int. Cl.
*B29C 51/44* (2006.01)
*B29C 51/26* (2006.01)

(52) U.S. Cl.
CPC ............ *B29C 51/44* (2013.01); *B29C 51/261* (2013.01)

(58) Field of Classification Search
CPC .............................. B29C 51/44; B29C 51/261
See application file for complete search history.

(56) References Cited

U.S. PATENT DOCUMENTS

2002/0127295 A1* 9/2002 Padovani ................ B29C 51/44
425/436 R
2004/0104506 A1* 6/2004 Schelmbauer ........ B29C 51/445
425/290

* cited by examiner

*Primary Examiner* — Monica A Huson
(74) *Attorney, Agent, or Firm* — HOVEY WILLIAMS LLP

(57) ABSTRACT

A pressware extractor assembly includes an elongated transport rail, a first car, a second car, and a powered drive mechanism. The first car includes a first car frame and a plurality of extractor elements operable to releasably hold respective products. The second car is slidably supported by the transport rail to slide laterally relative to the transport rail along the lateral rail axis, with the first car being supported to slide laterally with the second car. The powered drive mechanism shiftably supports the first car relative to the second car for vertical movement of the extractor elements relative to the mold assembly. The powered drive mechanism is configured to shift the first car between a lowered position, and a raised position, in which the products are lifted by the extractor elements.

18 Claims, 15 Drawing Sheets

LOW PROFILE PRODUCT EXTRACTOR FOR THERMOFORMED PRODUCTS

RELATED APPLICATIONS

The current patent application is a divisional patent application which claims priority benefit, with regard to all common subject matter, of earlier-filed U.S. patent application Ser. No. 18/623,244; titled "LOW PROFILE PRODUCT EXTRACTOR FOR THERMOFORMED PRODUCTS"; and filed Apr. 1, 2024, which is a non-provisional utility patent application which claims priority benefit, with regard to all common subject matter, of earlier-filed U.S. Provisional Application Ser. No. 63/494,405; entitled "LOW PROFILE PRODUCT EXTRACTOR FOR THERMOFORMED PRODUCTS"; and filed Apr. 5, 2023, both of which are hereby incorporated by reference, in their entireties, into the current patent application.

BACKGROUND

Current techniques for producing paper and plastic pressware products such as plates, bowls, trays, or the like involve high speed machines operating tools with several rows to produce high volumes of products at high rates. Current techniques for producing paper products involve forming the products in the webs and punching out the products at a single thermoforming station. Current techniques for producing plastic products involve . . . . Accordingly, in order to keep up with the high volume of products being formed at a high rate in the stations, the formed products need to be rapidly removed from the stations.

The background discussion is intended to provide information related to the present invention which is not necessarily prior art.

SUMMARY OF THE INVENTION

The present invention solves the above-described problems and other problems by providing an extractor assembly for a pressware thermoforming system.

An aspect of the present invention concerns a pressware extractor assembly configured to be provided as part of a picking station for moving a plurality of thermoformed products from a mold assembly. The pressware extractor assembly broadly includes an elongated transport rail, a first car, a second car, and a powered drive mechanism. The transport rail extends along and defines a lateral rail axis. The first car includes a first car frame and a plurality of extractor elements operable to releasably hold respective products. The second car is slidably supported by the transport rail to slide laterally relative to the transport rail along the lateral rail axis, with the first car being supported to slide laterally with the second car. The powered drive mechanism shiftably supports the first car relative to the second car for vertical movement of the extractor elements relative to the mold assembly. The powered drive mechanism is configured to shift the first car between a lowered position, in which the extractor elements are positioned to engage products held by the mold assembly, and a raised position, in which the products are lifted by the extractor elements out of engagement with the mold assembly.

Another aspect of the present invention concerns a pressware thermoforming system that broadly includes a mold assembly and a pressware extractor assembly. The mold assembly is configured to form a plurality of thermoformed products. The pressware extractor assembly is configured to move thermoformed products from the mold assembly. The pressware extractor assembly includes an elongated transport rail, a first car, a second car, and a powered drive mechanism. The transport rail extends along and defines a lateral rail axis. The first car includes a first car frame and a plurality of extractor elements operable to releasably hold respective products The second car is slidably supported by the transport rail to slide laterally relative to the transport rail along the lateral rail axis, with the first car being supported to slide laterally with the second car. The powered drive mechanism shiftably supports the first car relative to the second car for vertical movement of the extractor elements relative to the mold assembly. The powered drive mechanism is configured to shift the first car between a lowered position, in which the extractor elements are positioned to engage products held by the mold assembly, and a raised position, in which the products are lifted by the extractor elements out of engagement with the mold assembly.

Another aspect of the present invention concerns a method of moving thermoformed products from a mold assembly. The method broadly includes the steps of using a powered drive mechanism to lower a first car relative to a second car so that extractor elements of the first car are lowered into engagement with thermoformed products held by the mold assembly; and using the powered drive mechanism to raise the first car relative to the second car so that the extractor elements are raised so that the thermoformed products are lifted by the extractor elements out of engagement with the mold assembly.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
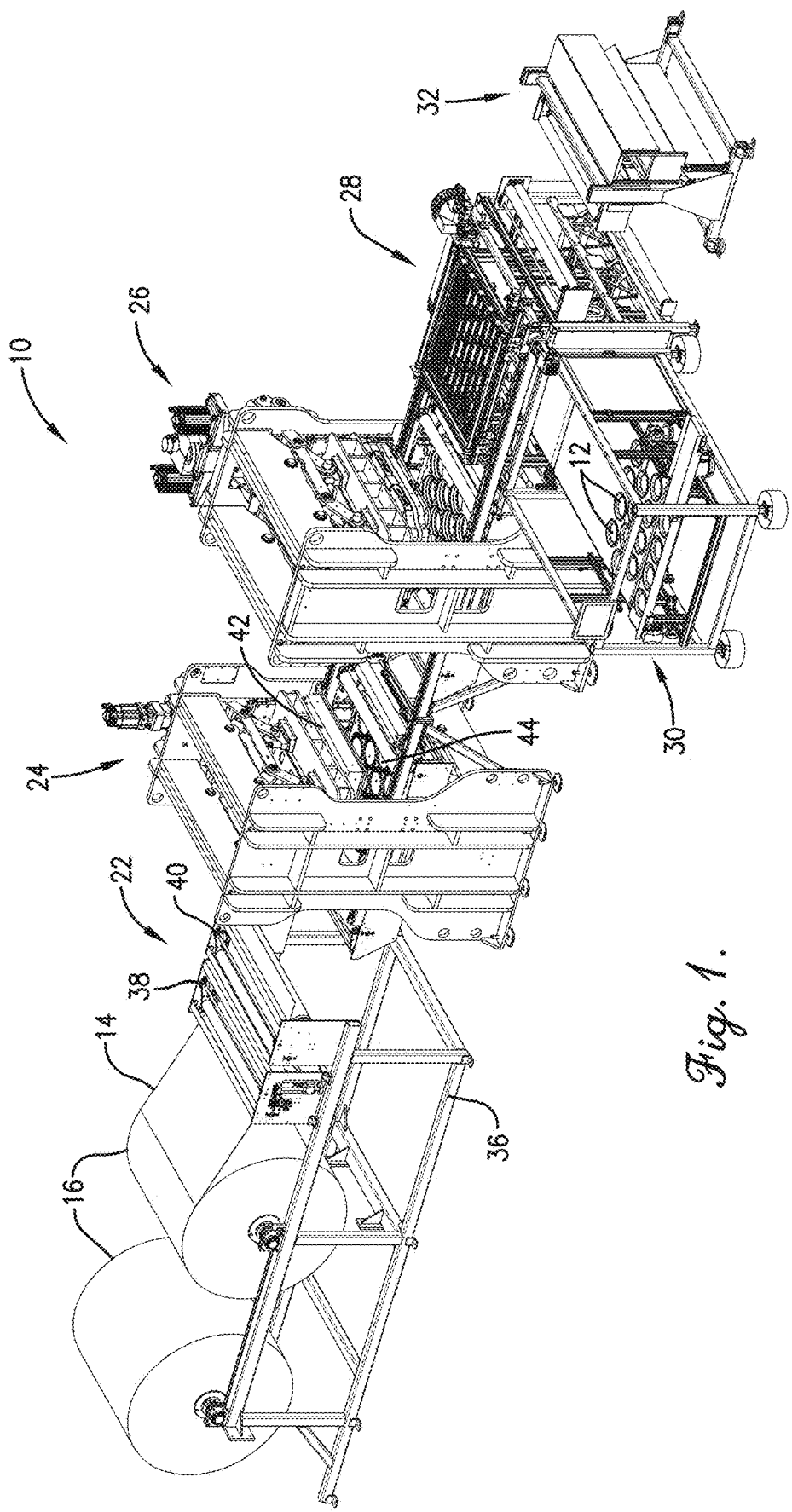
FIG. 1 is a perspective view of a system for producing pressware constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

Turning to FIG. 1, an exemplary pressware thermoforming system 10 is depicted in which embodiments of the present invention may be implemented. The system 10 is configured to form pressware products 12 from a web 14 drawn from, for example, a roll of material 16. The pressware products 12 may include plates, bowls, trays, or the like. The material 16 may comprise paper, polystyrene, recycled paper, vegetable or organic matter, cotton, bamboo, or the like. In one or more embodiments, the web 14 may instead comprise plastic material for forming plastic pressware products.

The illustrated pressware thermoforming system 10 broadly includes a decurling station 22, a scoring station 24, a forming station 26, a picking station 28, a stacking station 30, a chopping station 32, and a control system 34.

Still referring to FIG. 1, the decurling station 22 is configured to pull the web 14 from a corresponding roll. The decurling station 22 may include, among other things, a frame 36 and a pair of pull roller assemblies 38,40. The frame 36 may support one or more rolls of material 16, the pull roller assemblies 38,40, and other decurling components (such as a decurl roller and a decurling station actuator).

Scoring station 24 preferably scores the web 14 in preparation of forming products 12. Scoring station 24 includes, among other things, a scoring tool that comprises a top tool 42 and a bottom tool 44 with respective die plates.

Figure 2:
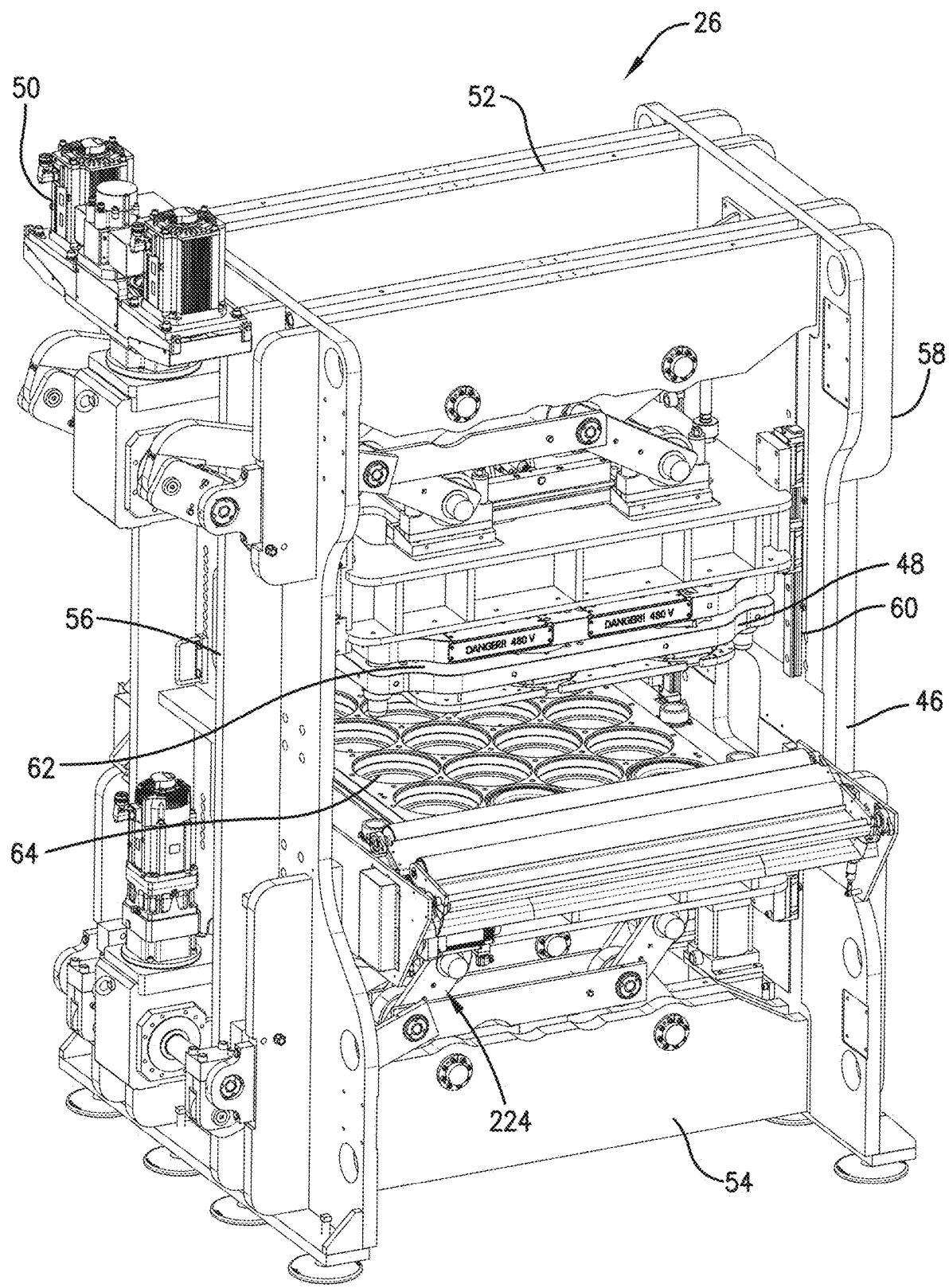
FIG. 2 is a perspective view of a forming station of the system of FIG. 1.

Turning to FIG. 2, the forming station 26 is configured to punch scored shapes out of the web 14 and form the products 12. The forming station 26 may comprise a forming station frame 46, a forming tool 48, and a forming station actuator 50. The forming station frame 46 is configured to support the forming tool 48 and the forming station actuator 50. Frame 46 may include an upper gantry 52 and a lower gantry 54 for supporting different portions of the forming tool 48 and upright supports 56,58. The upright supports 56,58 may include one or more tracks 60 for guiding the forming tool 48 and/or portions of the actuator 50.

Figure 3:
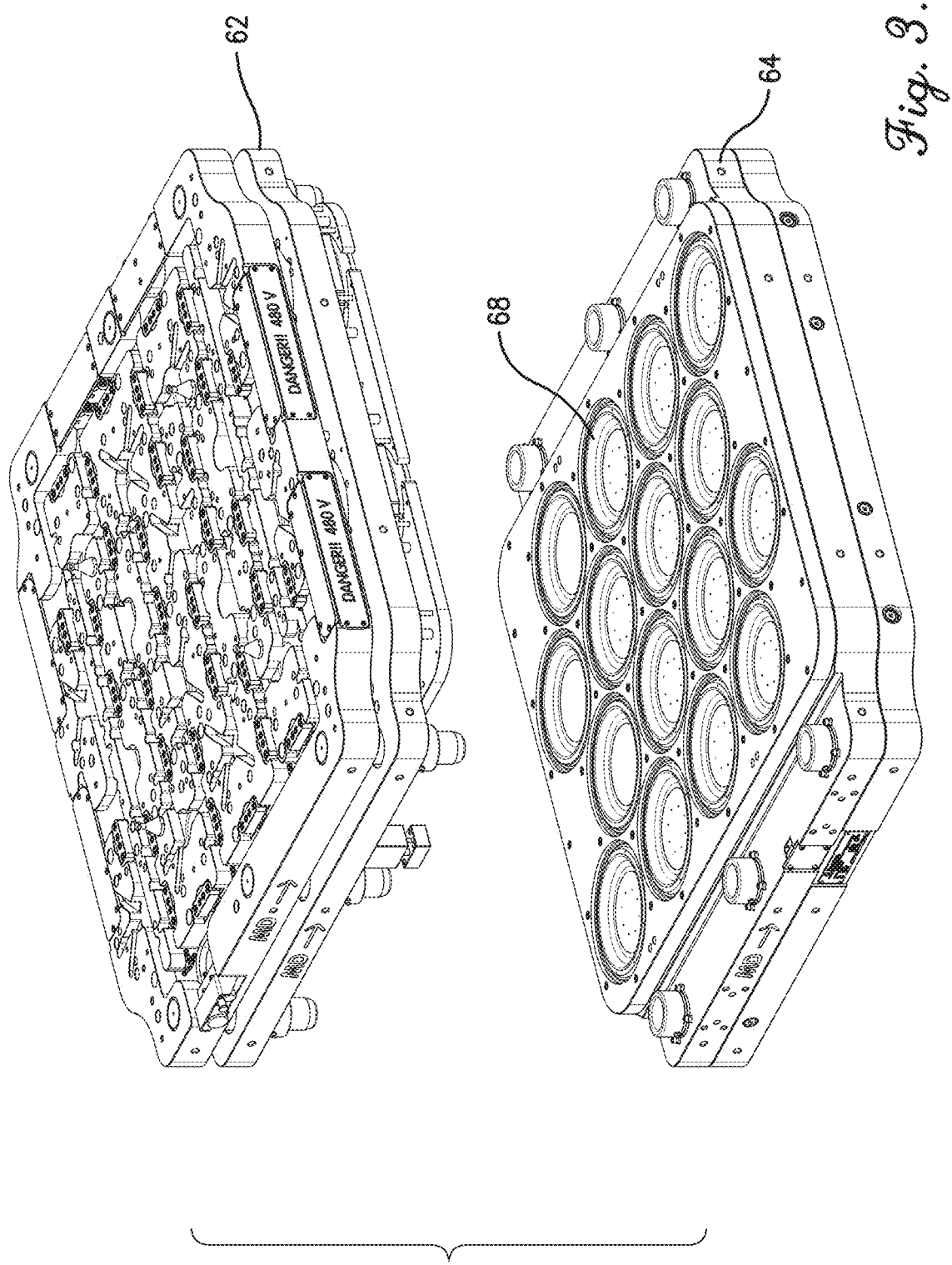
FIG. 3 is an elevated perspective view of a forming tool of the forming station of FIG. 2.
Figure 4:
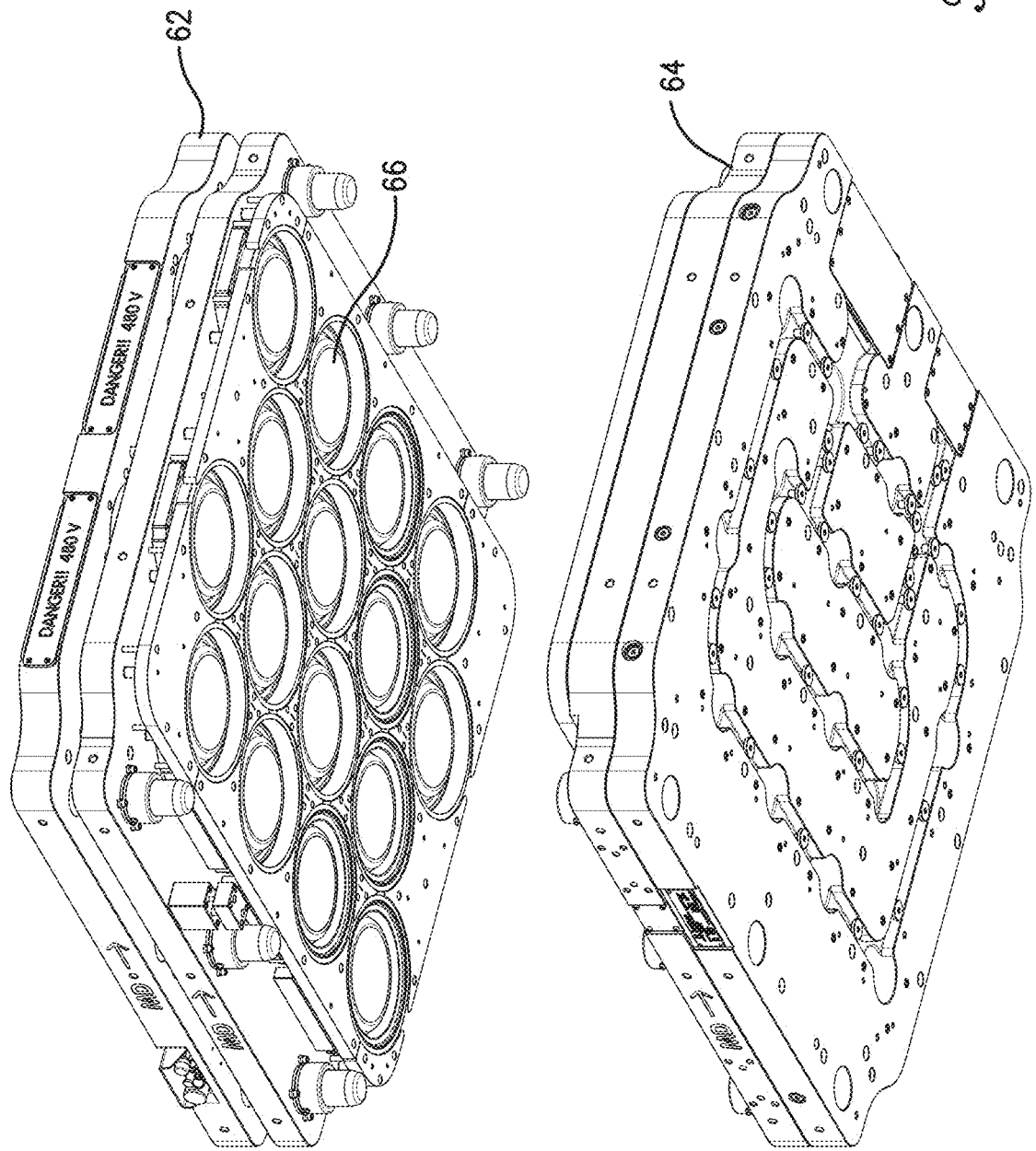
FIG. 4 is a lowered perspective view of the forming tool of FIG. 3.

Turning to FIGS. 3 and 4, the forming tool 48 is configured to be actuated to punch out the scored shapes and form the products 12. The illustrated forming tool 48 preferably includes a positive mold assembly 62 and a negative mold assembly 64 configured to cooperatively form a plurality of thermoformed products 12.

The positive mold assembly 62 may include heated molds 66 with bottom surfaces for forming top surfaces of the products 12. The negative mold assembly 64 may include negative molds 68 with top surfaces for forming bottom surfaces of the products 12.

Additional preferred details of the decurling station 22, scoring station 24, and forming station 26 are disclosed in U.S. Publication No. 2023/0009038, published Jan. 12, 2023, entitled METHODS AND SYSTEMS FOR PRODUCING PRESSWARE, which is hereby incorporated in its entirety by reference herein.

Figure 5:
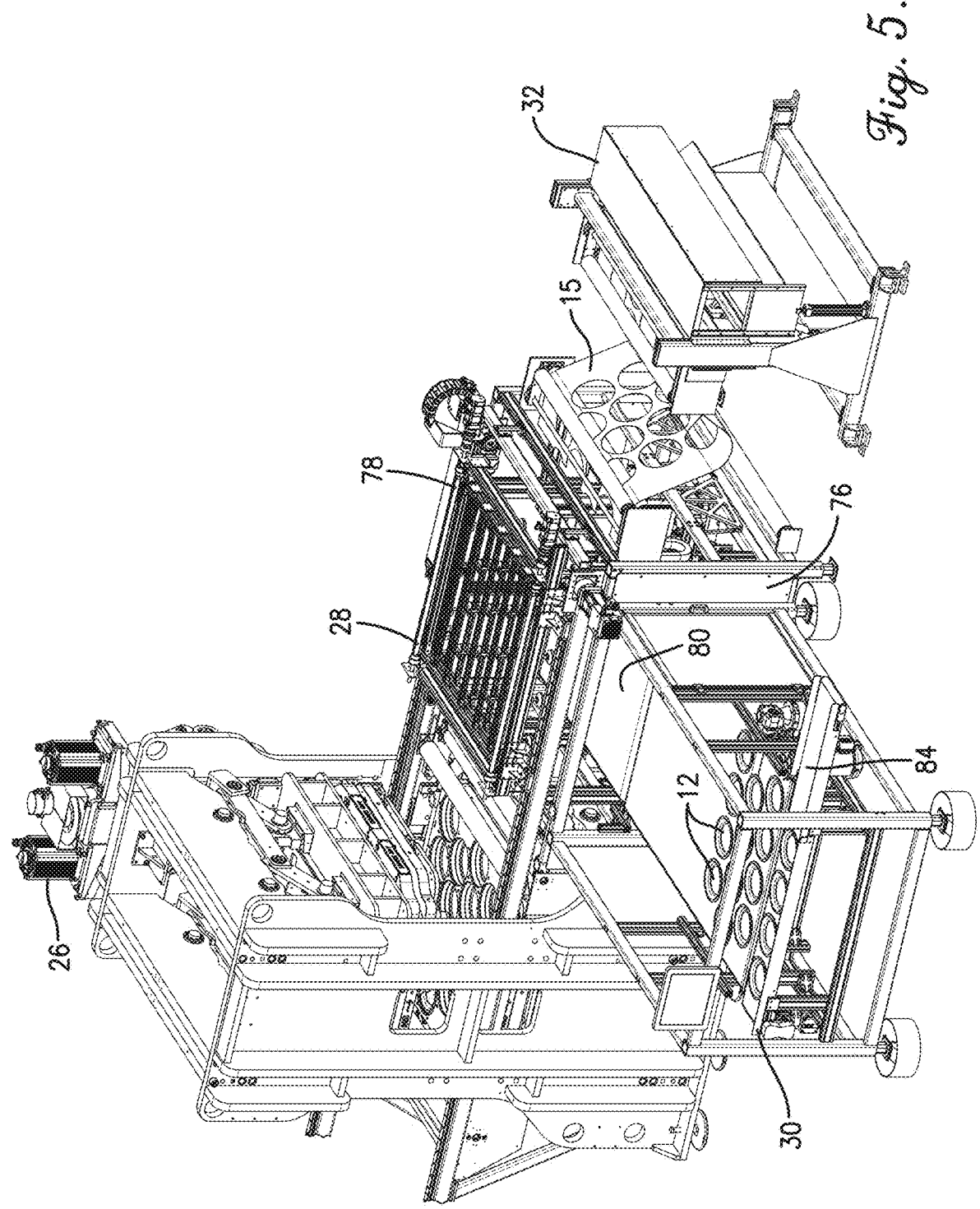
FIG. 5 is a perspective view of a picking station, stacking station, and chopping station of the system of FIG. 1.
Figure 6:
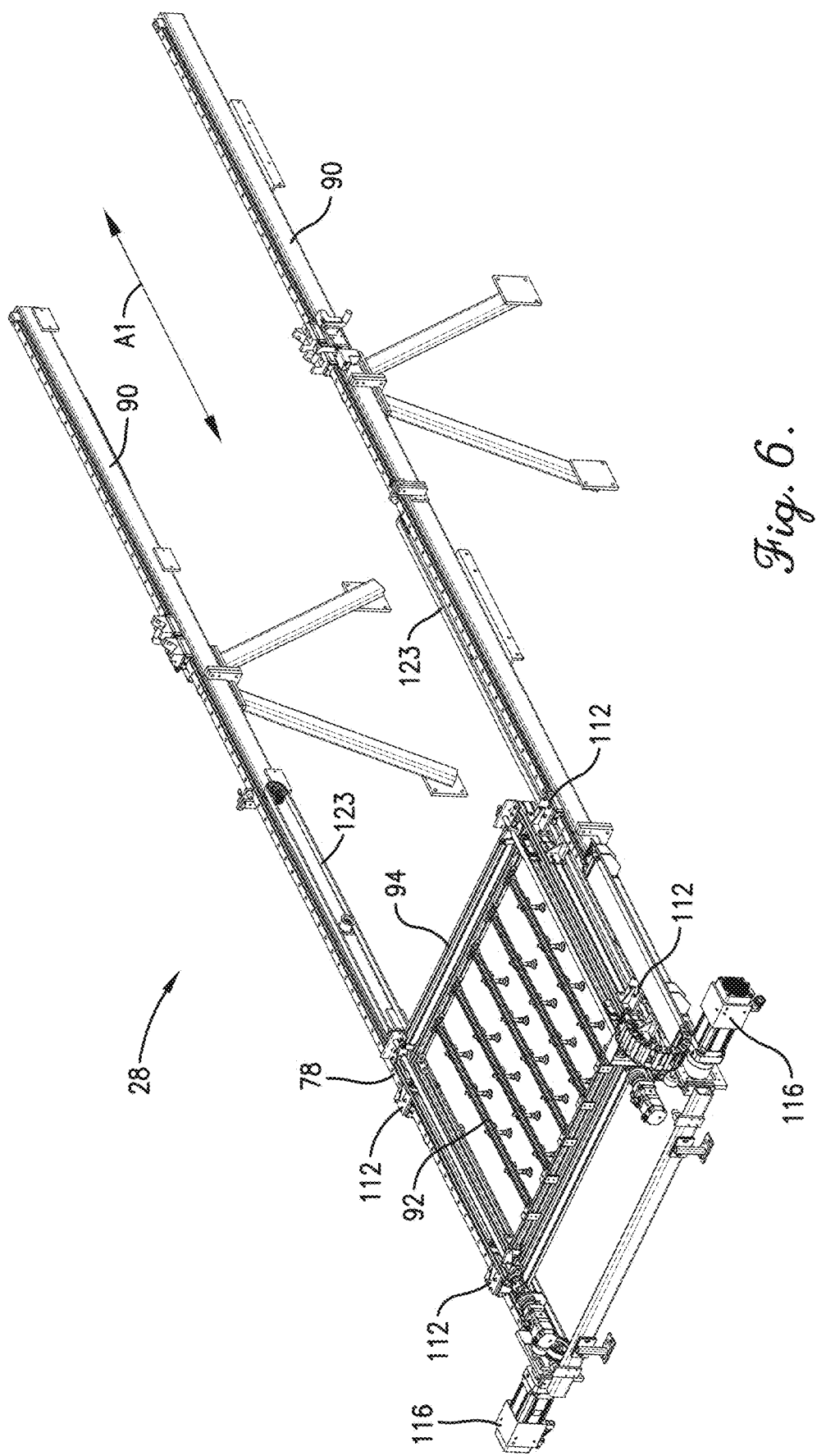
FIG. 6 is a fragmentary perspective view of the picking station of FIG. 1, showing a pressware extractor assembly with transport rails, a first car, a second car, a powered vertical drive mechanism, and a powered lateral drive mechanism.

Turning to FIG. 5, the depicted picking station 28 is operable to convey products 12 along the system 10. In particular, picking station 28 is configured to pick products 12 from the negative molds 68. While holding products 12, the picking station 28 may then transfer products 12 toward a conveyor and stacking station 30.

For certain aspects of the present invention, a picking station may be configured to convey products to and/or from another part of the system. For instance, an alternative system may have a picking station operable to pick products from the bottom tool of the scoring station. While holding products 12, such an alternative picking station may then transfer products to the forming station and position products onto negative molds.

The picking station 28 preferably includes a frame 76, a pressware extractor assembly 78, and a conveyor 80 (see FIG. 5). The frame 76 may be adjacent to the forming station 26 so that the picking station 28 receives scrap web 15 from the forming station 26 and can access the products 12 formed at the forming station 26.

The conveyor 80 may be positioned below transport rails supported on the frame 76 and configured to transport the products 12 dropped by the extractor assembly 78 to the stacking station 30. The stacking station 30 may include a transverse conveyor 84 (see FIG. 5) that receives rows of the products 12 from the conveyor 80 of the picking station 28 and transports each row transversely to a bin (not shown) causing the rows of products 12 to stack in the bin.

Turning to FIGS. 5-14, the pressware extractor assembly 78 is configured to move thermoformed products from the mold assemblies 62,64 and broadly includes elongated transport rails 90, a first car 92, a second car 94, a powered vertical drive mechanism 96, and a powered lateral drive mechanism 98.

Transport rails 90 comprise opposed transport rails 90 that extend generally parallel to one another. Transport rails 90 extend along and cooperatively define a lateral rail axis A1 (see FIG. 6). The first car 92 extends laterally between the opposed transport rails 90.

The illustrated first and second cars 92,94 are cooperatively supported by rails 90. It is also within the scope of certain embodiments for the cars to be shiftably supported by an alternative rail configuration. For instance, cars may be supported by a single rail or more than two rails. Alternative embodiments may also have the cars supported by a structure other than rails.

Figure 7:
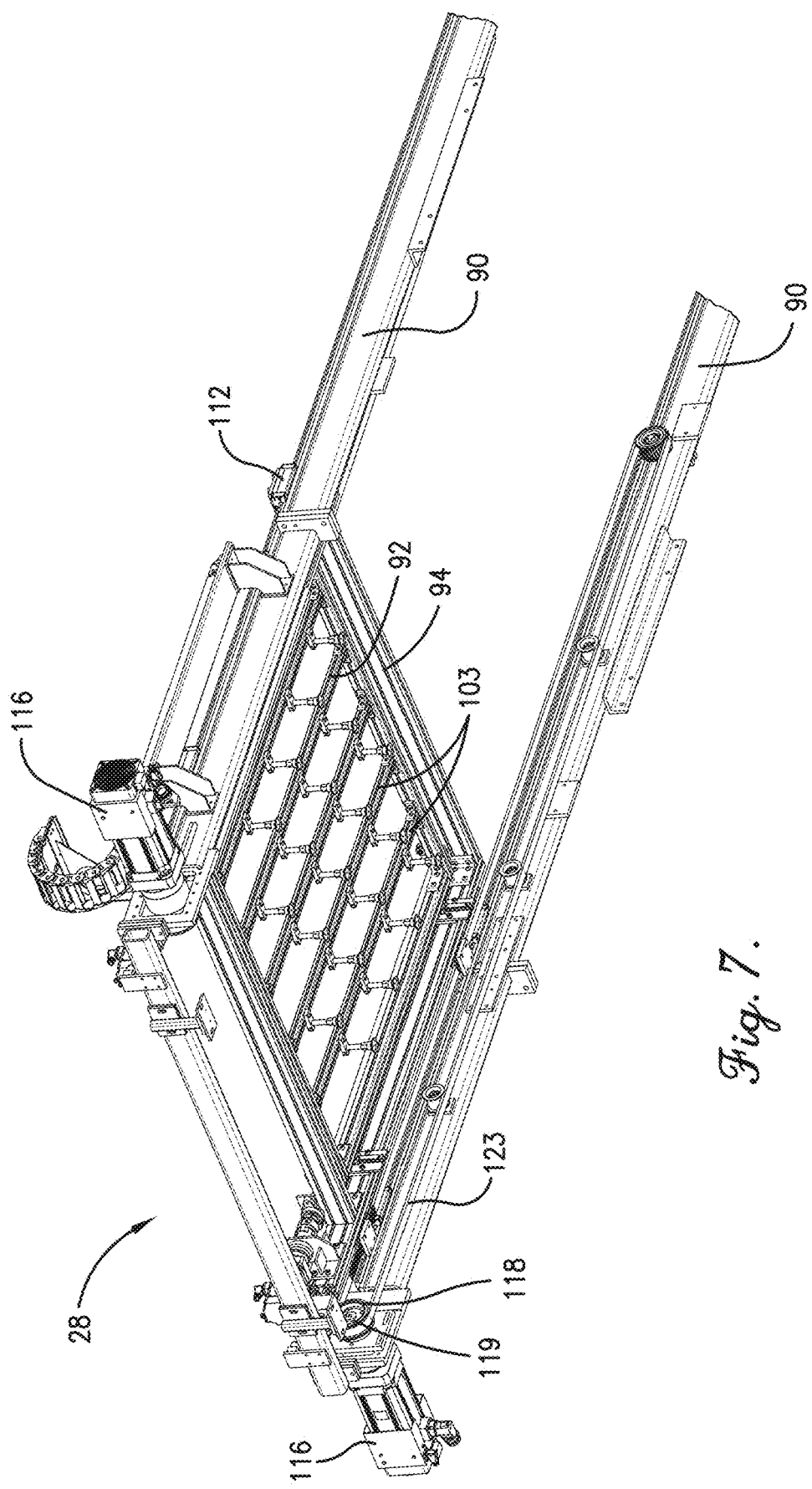
FIG. 7 is an enlarged fragmentary lowered perspective view of the picking station of FIG. 1, showing the toothed belt and extractor elements.
Figure 8:
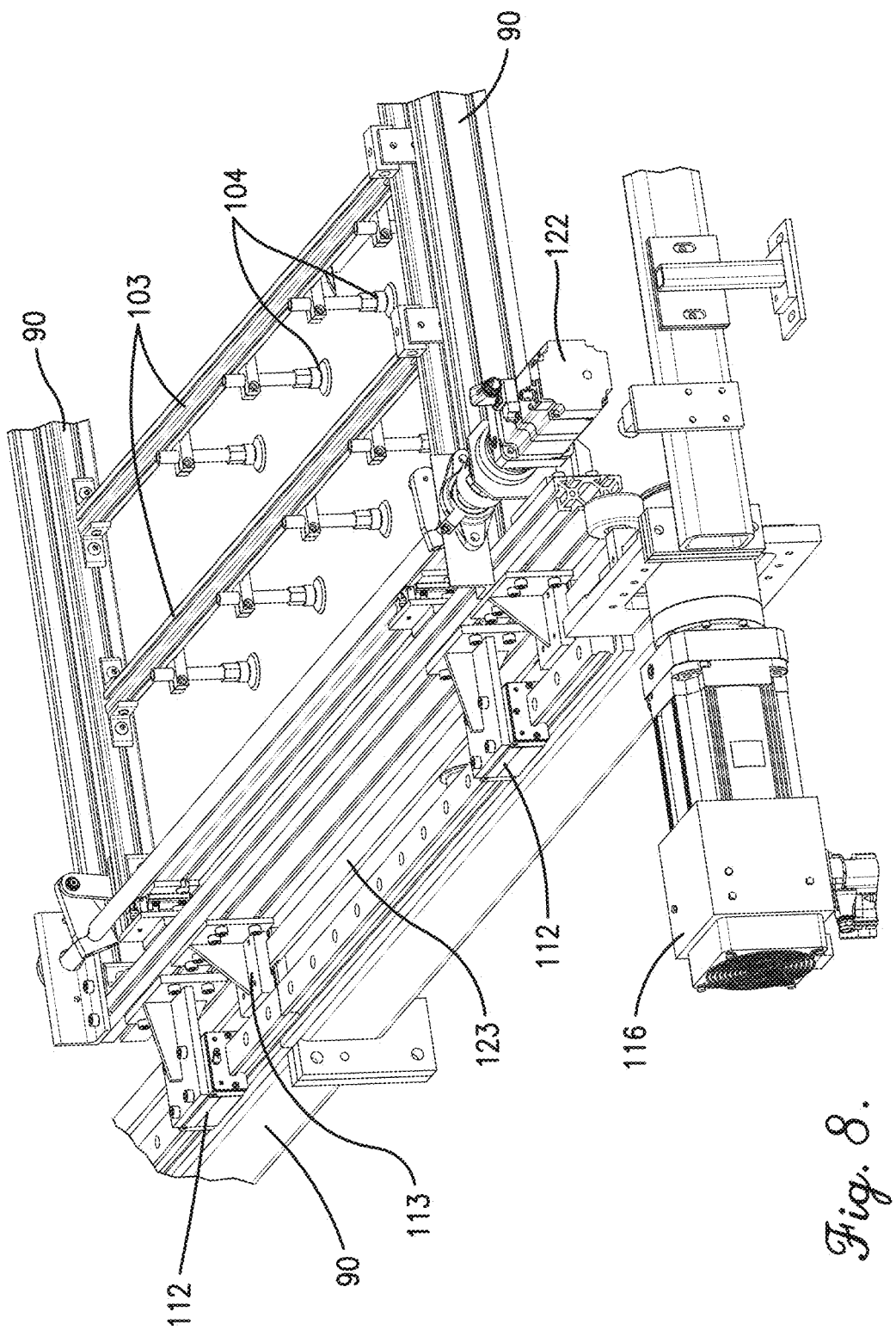
FIG. 8 is an enlarged fragmentary elevated perspective view of the picking station of FIG. 1, showing bearings that slidably engage transport rails.
Figure 9:
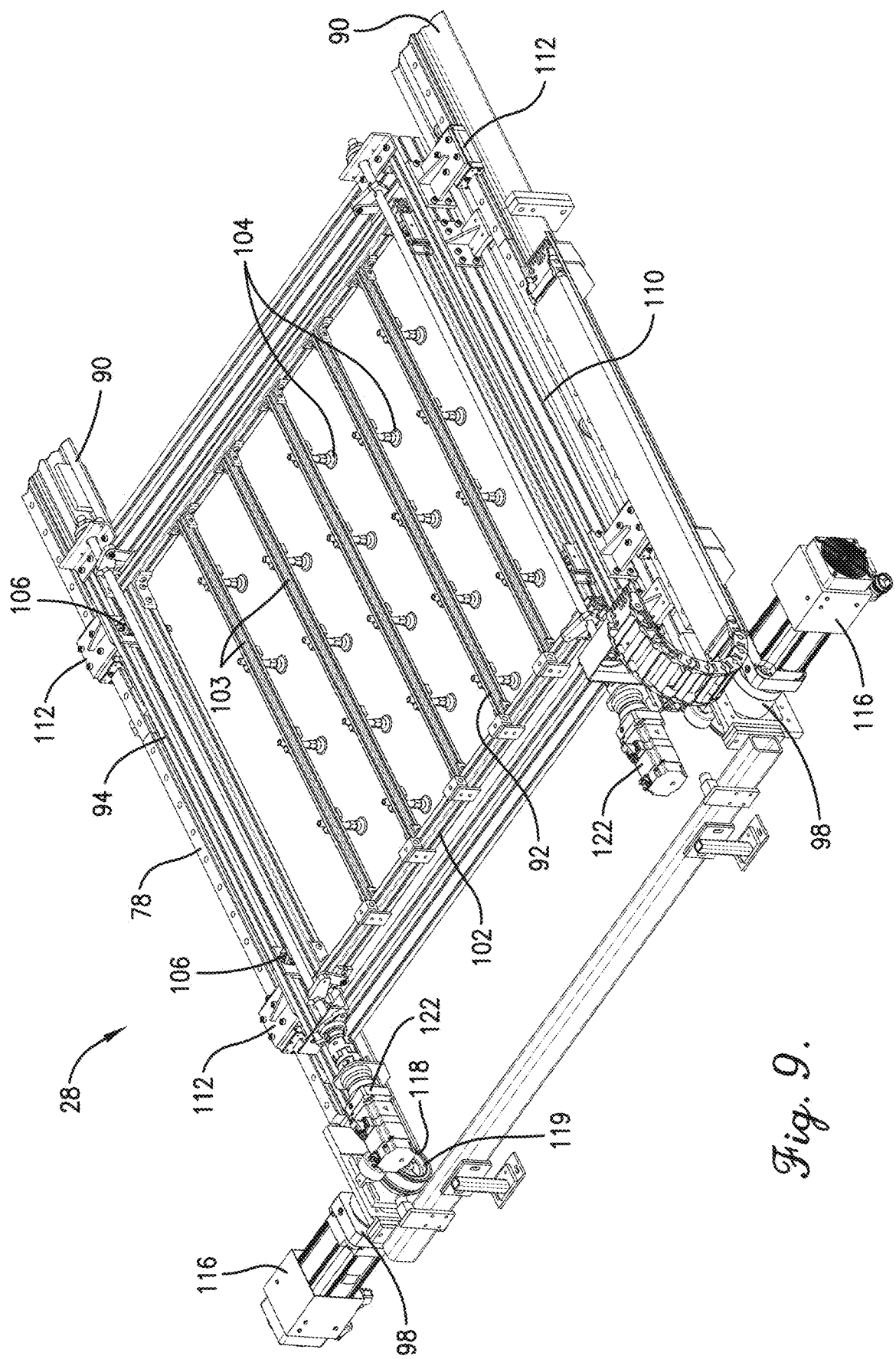
FIG. 9 is an enlarged fragmentary perspective view of the picking station of FIG. 1.
Figure 10:
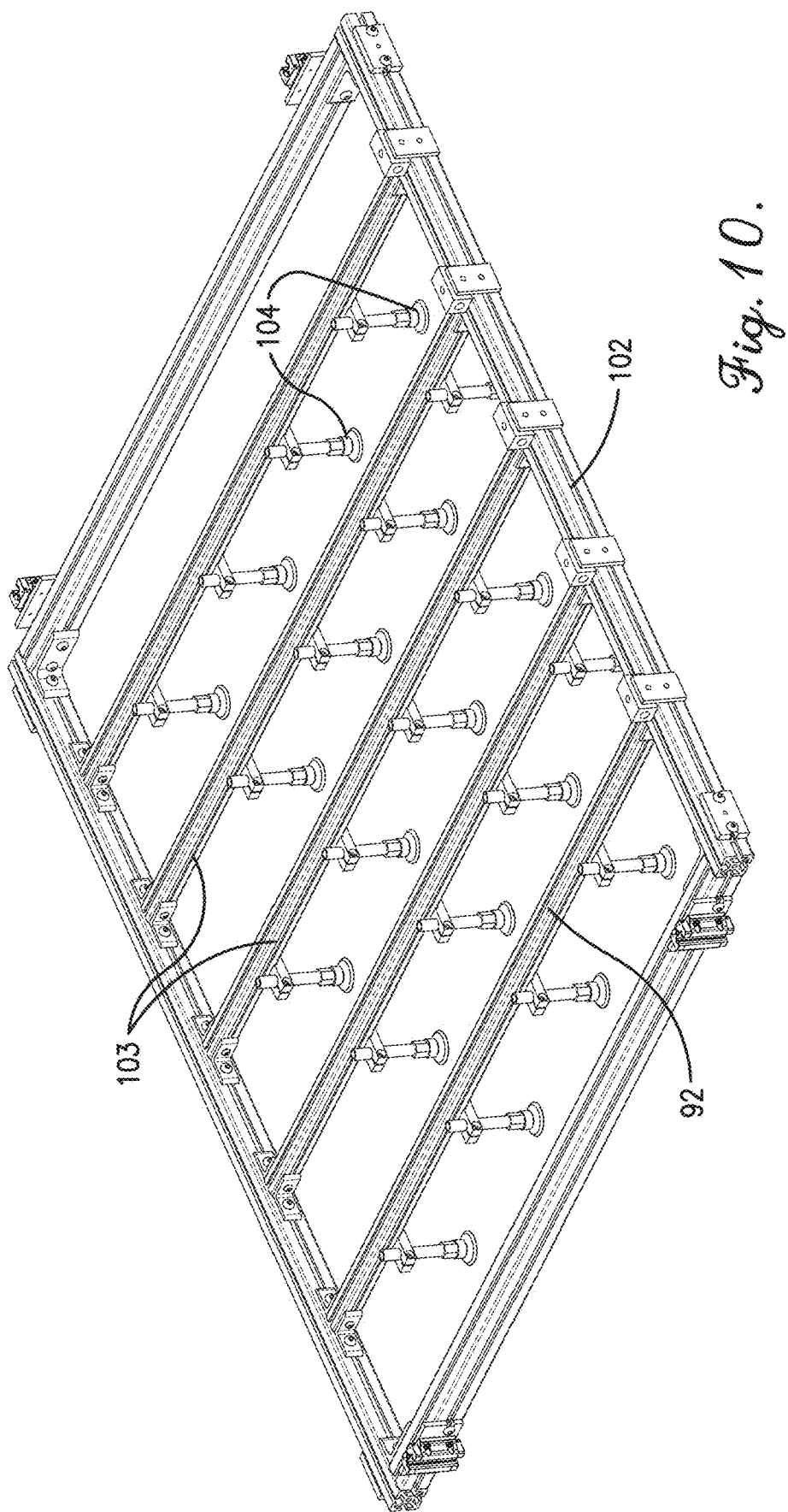
FIG. 10 is an enlarged elevated perspective view of the first car.
Figure 11:
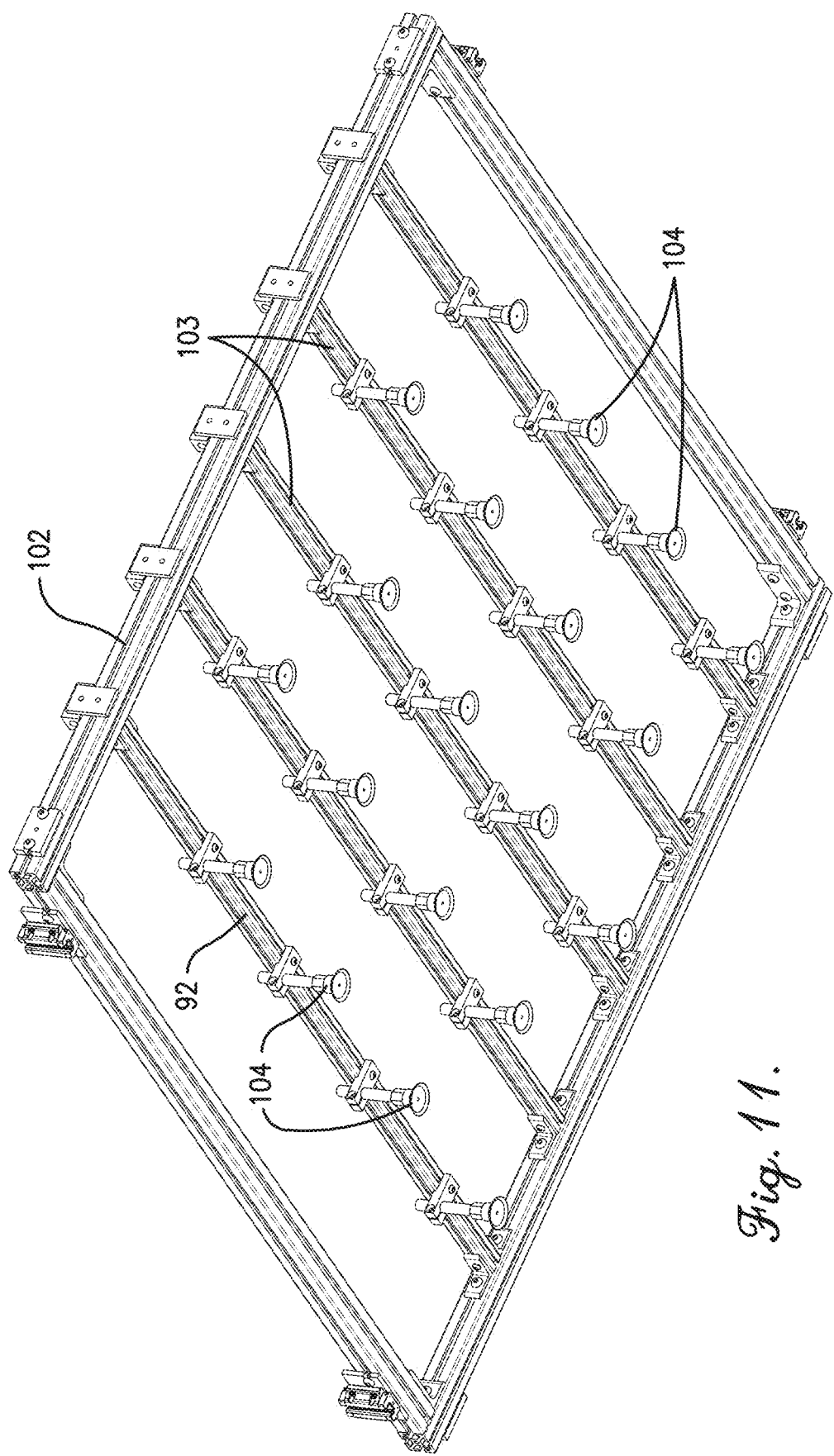
FIG. 11 is an enlarged lowered perspective view of the first car.
Figure 12:
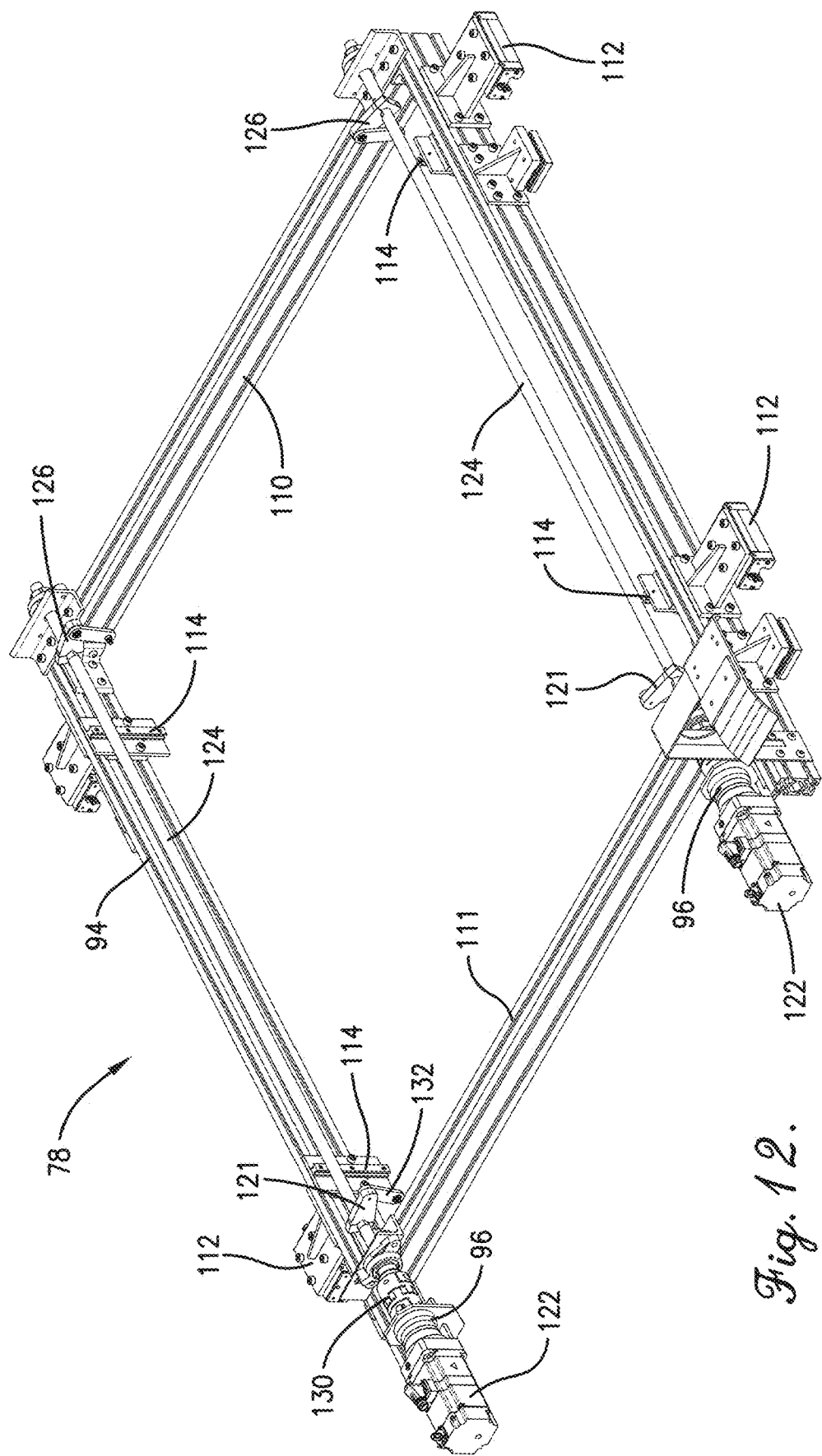
FIG. 12 is an enlarged perspective view of the second car and powered vertical drive mechanism supported on the second car.

The first car 92 includes a first car frame 102, cross members 103, and a plurality of extractor elements 104 operable to releasably hold respective products 12 (see FIGS. 7, 9, and 10). First car frame 102 defines an opening that is spanned by cross members 103, which are fixed to the first car frame 102 and support the extractor elements 104. Each extractor element 104 preferably comprises a vacuum cup. The extractor element 104 fluidly communicates with a vacuum source, such as a vacuum pump (not shown), via a corresponding pneumatic line (not shown).

The first car 92 also preferably includes bearings 106 mounted on the first car frame 102. Bearings 106 are operable to be slidably engaged with upright slide rails of the second car 94. It is also within the scope of the present invention for the first car to have an alternative sliding connection with the second car. For instance, the first car may include slide rails that engage bearings of the second car.

It is also consistent with certain aspects of the present invention for the first car to have alternative extractor elements for removably engaging and holding respective products. For instance, one or more extractor elements may include electromagnetic or electrostatic elements operable to engage a formed product.

Turning to FIGS. 7-14, the second car 94 is slidably supported by the transport rails 90 to slide laterally relative to the transport rails 90 along the lateral rail axis A1. First car 92 is preferably supported to slide laterally with the second car 94. Second car 94 includes a second car frame 110 that supports the powered drive mechanism 96 and defines an opening 111. Second car 94 also includes bearings 112 that slidably engage the transport rails 90 (see FIGS. 7 and 8). In the illustrated embodiment, first car 92 is preferably removably received by the opening 111 so that the first car 92 is nested within the second car 94 in at least one of the raised and lowered positions (e.g., see FIG. 13).

The second car 94 also preferably includes upright slide rails 114 mounted on the second car frame 110. Slide rails 114 are preferably slidably engaged with respective bearings 106 to permit relative vertical sliding movement between the first and second cars 92, 94. As noted above, it is also within the scope of the present invention for the first car to have an alternative sliding connection with the second car.

The lateral drive mechanism 98 is operably associated with the second car 94 and the transport rails 90 and is configured to drive the second car 94 along the lateral rail axis A1. Because the first car 92 is supported relative to the second car 94 (as described below), the first car 92 is preferably shifted with the second car 94 by the lateral drive mechanism 98. Lateral drive mechanism 98 preferably comprises a powered actuator and includes motors 116 that power respective belt drives 118. The belt drive 118 includes a rotatable drive sheave 119 (see FIG. 7) that powers a toothed belt 123 extending along the length of the transport rails 90. The belt 123 is operably supported by rotatable idlers 120 mounted at spaced positions along the transport rails 90 (see FIG. 14). In one or more embodiments, the second car 94 is operatively associated with the belt 123 via clamp brackets 113. Each motor 116 preferably comprises a servo motor. By including two or more motors 116, the lateral drive mechanism 98 enables very high motion velocity. Specifically, the two or more motors 116 enable higher acceleration because the combined rotational mass inertia of two motors is less than the rotational mass inertia of an equivalent single motor.

It is also within the ambit of at least certain aspects of the present invention for the extractor assembly to include an alternative lateral drive mechanism. For instance, the lateral drive mechanism may have a transmission other than the belt drive, such as a chain drive or a gear drive with a worm. Alternative embodiments of the lateral drive mechanism may also include an alternative motor, such as a linear motor.

The powered vertical drive mechanism 96 shiftably supports the first car 92 relative to the second car 94 for vertical movement of the extractor elements 104 relative to the scoring station 24, forming station 26, and stacking station 30. For instance, the vertical drive mechanism is configured to shift the first car 92 relative to the second car 94 for vertical movement of extractor elements relative to mold assemblies 62, 64 along a vertical axis V (see FIG. 13).

Vertical drive mechanism 96 is configured to shift the first car 92 between a lowered position, in which the extractor elements 104 are positioned to engage products 12 held by the negative mold assembly 64, and a raised position, in which the products 12 are lifted by the extractor elements 104 out of engagement with the mold assembly 64.

The vertical drive mechanism 96 comprises a powered actuator that includes opposed linkages 121, which drivingly interconnect the first and second cars 92, 94 to facilitate vertical movement of the first car 92 relative to the second car 94.

Vertical drive mechanism 96 also preferably includes motors 122 drivingly engaged with the respective linkages 121 to power the linkages 121 and the first car 92 between the lowered position and the raised position. Each motor 122 preferably comprises a servo motor.

The opposed linkages 121 are located adjacent to respective transport rails 90. Each linkage 121 drivingly interconnects the first and second cars 92, 94 to facilitate vertical movement of the first car 92 relative to the second car 94. Each linkage 121 preferably includes a rotatable driven shaft 124 and a pair of rocker arms 126 mounted on the driven shaft 124 to rotate therewith (sec FIG. 12).

Each motor 122 includes a rotatable motor shaft 128 attached relative to the driven shaft 124 so that rotation of the motor shaft 128 produces corresponding rotation of the driven shaft 124. Preferably, the shafts 124, 128 are drivingly connected to each other by a respective flexible shaft coupler 130.

Each rocker arm 126 is drivingly attached relative to the first car 92 so that rotation of the driven shaft 124 and the rocker arm 126 produces corresponding vertical movement of the first car 92 relative to the second car 94.

Figure 13:
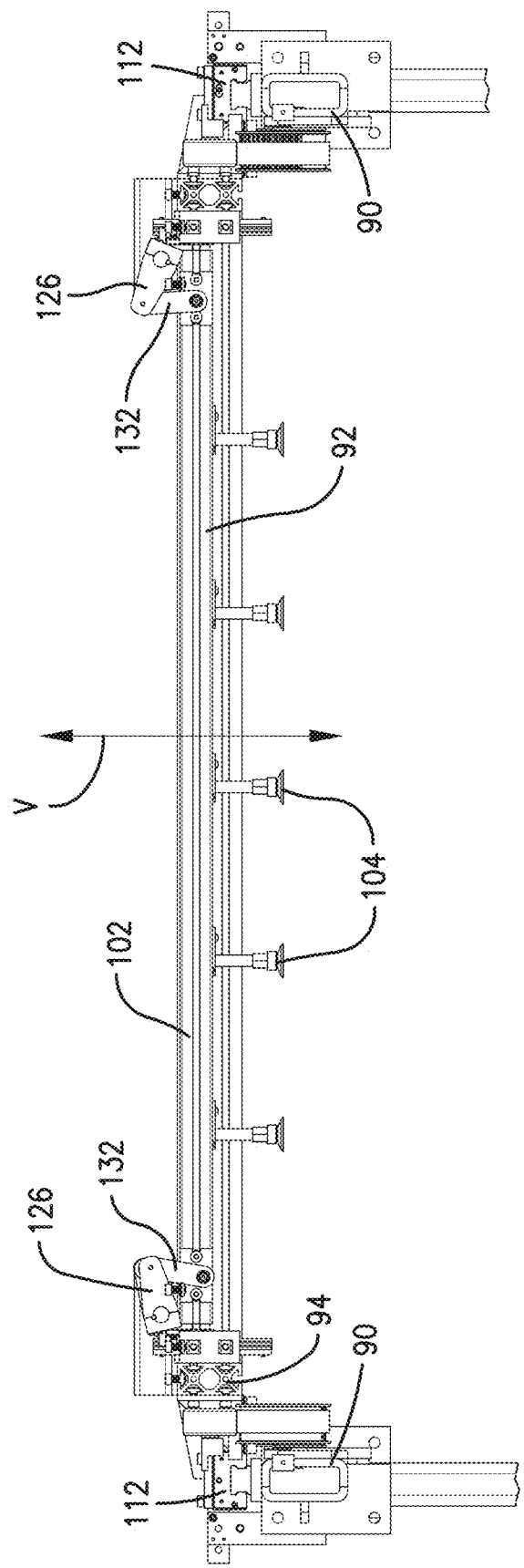
FIG. 13 is a cross-sectional view of the picking station of FIG. 1, taken along a lateral rail axis of the transport rails and showing extractor elements supported by the first car.
Figure 14:
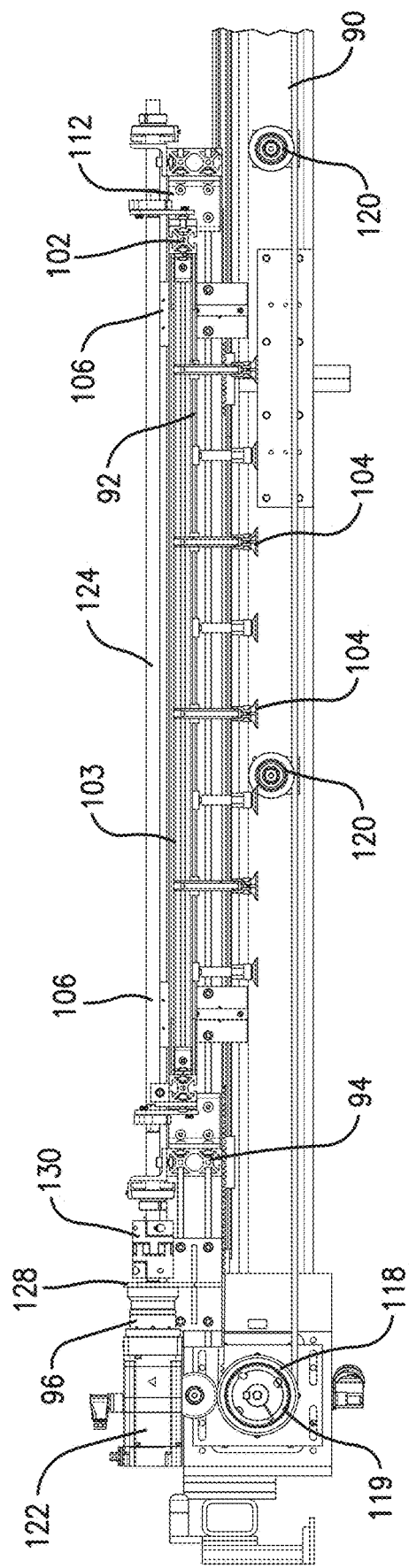
FIG. 14 is a cross-sectional view of the picking station of FIG. 1, taken transversely to the lateral rail axis.

Each linkage 121 includes a follower link 132 pivotally attached to the rocker arm 126 and the first car 92 (see FIG. 13). The vertical drive mechanism 96 enables a very low vertical profile, which helps allow for the high motion velocity of the lateral movement along the axis A1.

It is within the scope of at least certain aspects of the present invention for embodiments of the vertical drive mechanism to include an alternative linkage configuration. For instance, the rocker arm and/or follower link may be alternatively sized and/or shaped. An alternative linkage may also be devoid of one or both of the rocker arm and follower link.

An alternative vertical drive mechanism may include a transmission other than a linkage. Such alternative transmissions may include a belt drive, chain drive, and/or a gear drive. Alternative embodiments of the lateral drive mechanism may also include an alternative motor, such as a linear motor.

Figure 15:
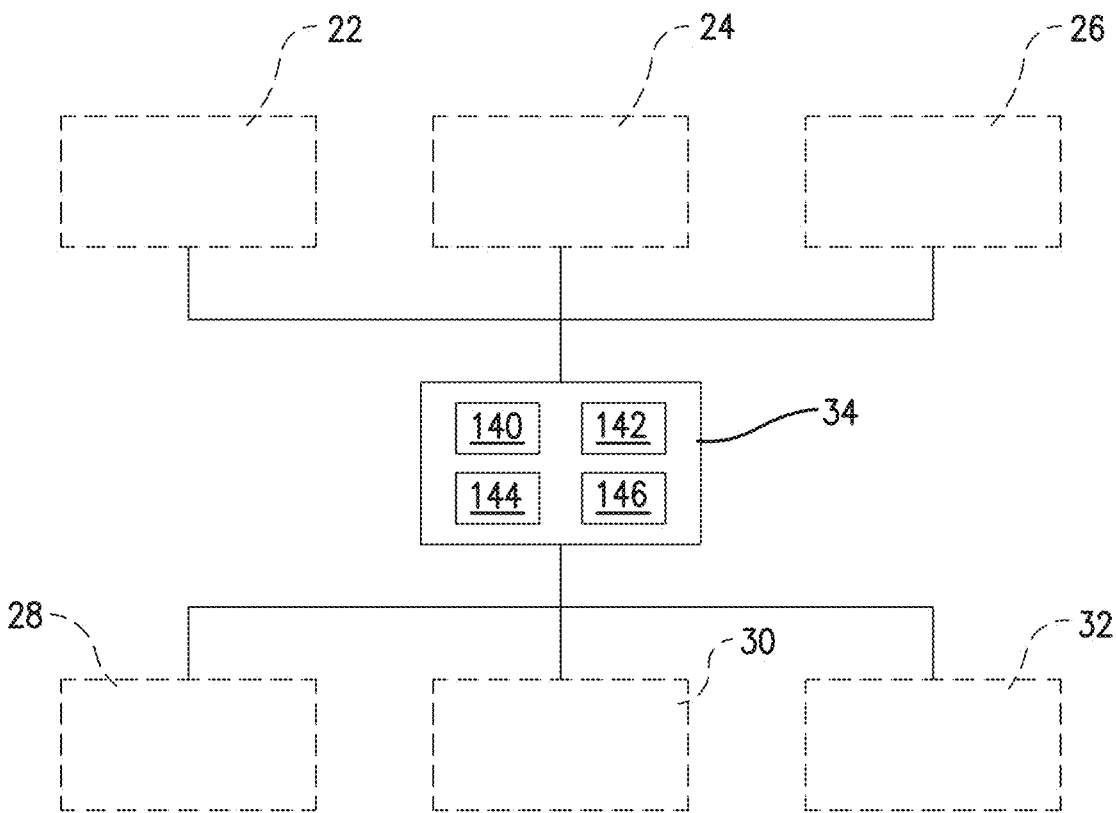
FIG. 15 is a block diagram depicting selected components of the system of FIG. 1.

Turning to FIG. 15, components of system 10 may be controlled by and/or in communication with the control system 34. The control system 34 may comprise a communication element 140, a memory element 142, a user interface 144, and a processing element 146. The communication element 140 may generally allow communication with systems or devices external to the system 10. The communication element 140 may include signal or data transmitting and receiving circuits, such as antennas, amplifiers, filters, mixers, oscillators, digital signal processors (DSPs), and the like. The communication element 140 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 140 may be in communication with the processing element 146 and the memory element 142.

Memory element 142 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 142 may be embedded in, or packaged in the same package as, the processing element 146. The memory element 142 may include, or may constitute, a "computer-readable medium". The memory element 142 may store the instructions, code, code segments, software, firmware, programs, applications, apps, services, daemons, or the like that are executed by the processing element 146.

The user interface 144 generally allows the user to utilize inputs and outputs to interact with the system 10 and is in communication with the processing element 146. Inputs may include buttons, pushbuttons, knobs, jog dials, shuttle dials, directional pads, multidirectional buttons, switches, keypads, keyboards, mice, joysticks, microphones, or the like, or combinations thereof. The outputs of the present invention include a display (not shown) but may include any number of additional outputs, such as audio speakers, lights, dials, meters, printers, or the like, or combinations thereof, without departing from the scope of the present invention.

The processing element 146 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 146 may generally execute, process, or run instructions, code, code segments, software, firmware, programs, applications, apps, processes, services, daemons, or the like. The processing element 146 may also include hardware components such as finite-state machines, sequential and combinational logic, and other electronic circuits that can perform the functions necessary for the operation of the current invention. The processing element 146 may be in communication with the other electronic components through serial or parallel links that include address buses, data buses, control lines, and the like.

For example, the processing element 146 of the control system 34 may be in communication with and configured to direct the drive mechanisms 96, 98 of the picking station 28 to shift the cars 92, 94 so that the suspended vacuum cups of the extractor elements 104 are positioned over the formed products 12. The processing element 146 may be configured to direct the drive mechanism 96 to lower the extractor elements 104 so that they engage the products 12, lift the extractor elements 104 so that the extractor elements 104 pull the products 12 away from their scrap web 15, and shift the extractor elements 104 and products 12 to a position above the conveyor 80. The processing element 146 may be configured to cause the extractor elements 104 to disengage the products 12 so that the products 12 fall onto the conveyor 80.

The processing element 146 may be configured to direct the conveyor 80 to activate so that the products 12 are transported to the transverse conveyor 84, which the processing element 146 may also cause to be activated so that the products 12 are stacked in a bin (not shown).

Figure 16:
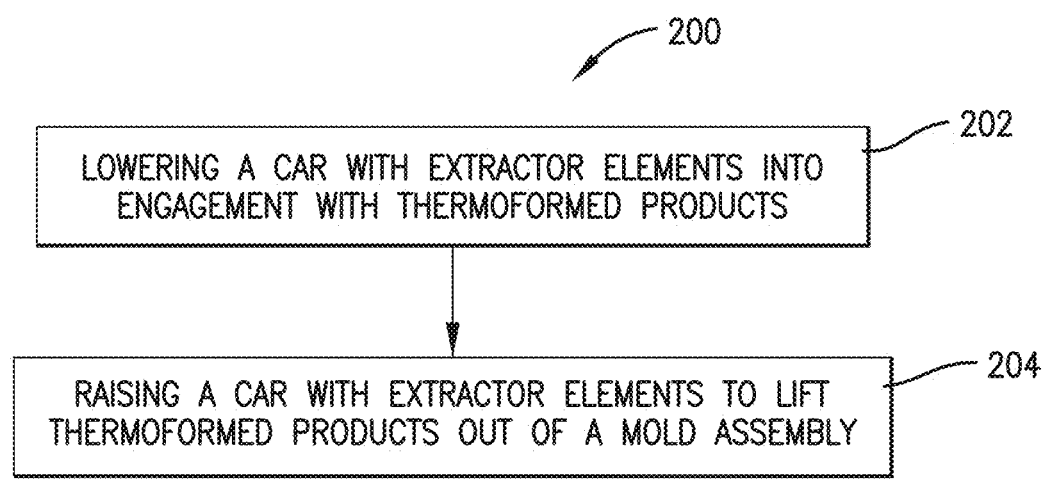
FIG. 16 is a flowchart depicting exemplary steps of a method according to an embodiment of the present invention.

The picking station 28 of system 10 is configured to move thermoformed products from a mold assembly of the forming tool 48. The flow chart of FIG. 16 depicts steps of an exemplary method 200 of moving thermoformed products.

The method 200 is described below, for case of reference, as being executed by exemplary devices and components introduced with the embodiments illustrated in FIGS. 1-15. The steps of the method 200 may be performed by the control system 34 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium (s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 202, the powered drive mechanism 96 of the extractor assembly 78 may be used to lower the first car 92 relative to the second car 94 so that extractor elements 104 of the first car 92 are lowered into engagement with thermoformed products 12 held by the mold assembly 64.

Referring to step 204, the powered drive mechanism 96 may be used to raise the first car 92 relative to the second car 94 so that the extractor elements 104 are raised so that the thermoformed products 12 are lifted by the extractor elements 104 out of engagement with the mold assembly 64.

In additional preferred steps, the drive shaft of the powered drive mechanism may be rotated to raise the first car and/or lower the first car. During the step of using the powered drive mechanism to raise the first car, the vacuum source may be engaged so that the vacuum cups releasably hold respective thermoformed products. After the step of using the powered drive mechanism to raise the first car, the vacuum source may be disengaged to release the thermoformed products from the vacuum cups. During at least part of the step of engaging the vacuum source so that the vacuum cups releasably hold respective thermoformed products, at least one of the first car and second car may be shifted laterally to move the thermoformed products away from the mold assembly.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of moving thermoformed products from a mold assembly, said method comprising the steps of:
    (a) using a powered drive mechanism to lower a first car relative to a second car so that extractor elements of the first car are lowered into engagement with thermoformed products held by the mold assembly;
    (b) using the powered drive mechanism to raise the first car relative to the second car so that the extractor elements are raised so that the thermoformed products are lifted by the extractor elements out of engagement with the mold assembly; and
    (c) shifting at least one of the first car and the second car laterally to move the thermoformed products away from the mold assembly,
    wherein said extractor elements comprising vacuum cups that fluidly communicate with a vacuum source and releasably engage the thermoformed products, and during step (b), engaging the vacuum source so that the vacuum cups releasably hold respective thermoformed products.

2. The method of claim 1, further comprising the step of:
    (d) after step (b), disengaging the vacuum source to release the thermoformed products from the vacuum cups.

3. A method of moving thermoformed products from a mold assembly, said method comprising the steps of:
    shifting, via a powered drive mechanism, a first car frame in a downward direction so that a plurality of extractor elements connected to the first car frame releasably engage respective products held by the mold assembly;
    shifting, via the powered drive mechanism, the first car in an upward direction so that the plurality of extractor elements connected to the first car frame to lift the respective products out of engagement with the mold assembly; and
    shifting, via a lateral drive mechanism, a second car along an elongated transport rail that extends along and defines a lateral rail axis, the first car and the powered drive mechanism being supported to shift laterally with the second car to move the products away from the mold assembly.

4. The method of claim 3,
    said powered drive mechanism including a linkage that drivingly interconnects the first and second cars to facilitate vertical movement of the first car relative to the second car.

5. The method of claim 4,
    said powered drive mechanism including a motor drivingly engaged with the linkage to power the linkage and the first car between a lowered position and a raised position.

6. The method of claim 5,
    said linkage including a rotatable driven shaft and a rocker arm mounted on the driven shaft to rotate therewith,
    said motor including a drive shaft attached relative to the driven shaft so that rotation of the drive shaft causes corresponding rotation of the driven shaft,
    said rocker arm drivingly attached relative to the first car so that rotation of the driven shaft and the rocker arm produces corresponding vertical movement of the first car relative to the second car.

7. The method of claim 6,
    said linkage including a follower link pivotally attached to the rocker arm and the first car.

8. The method of claim 4,
    one of said first and second cars including an upright slide rail, and the other one of said first and second cars including a bearing slidably engaged with the upright slide rail, with the slide rail and bearing cooperatively permitting relative vertical movement and restricting relative lateral movement between the first and second cars.

9. The method of claim 3,
    said transport rail comprising opposed transport rails that extend generally parallel to one another, with the first car extending between the opposed transport rails.

10. The method of claim 9,
    said powered drive mechanism including opposed linkages located adjacent to respective transport rails,
    said linkages drivingly interconnecting the first and second cars to facilitate vertical movement of the first car relative to the second car.

11. The method of claim 10,
said powered drive mechanism including motors drivingly engaged with respective ones of the linkages to power the linkages and cooperatively drive the first car between a lowered position and a raised position.

12. The method of claim 11,
each of said linkages including a rotatable driven shaft and a rocker arm mounted on the driven shaft to rotate therewith,
each of said motors including a drive shaft attached relative to the respective driven shaft so that rotation of each drive shaft causes corresponding rotation of the respective driven shaft,
each of said rocker arms drivingly attached relative to the first car so that rotation of the driven shafts and the rocker arms produces corresponding vertical movement of the first car relative to the second car.

13. The method of claim 3,
said second car including a second car frame that supports the powered drive mechanism, with the first car being nested relative to the second car in at least one of the raised and lowered positions.

14. The method of claim 3,
said extractor elements comprising vacuum cups that fluidly communicate with a vacuum source.

15. The method of claim 3, further comprising releasing the products from the extractor elements.

16. A method of thermoforming products, the method comprising the steps of:
positioning, via one or more roller assemblies, a web material between molds;
pressing, via an actuator, the web between the molds to form the products in the web;
removing, via one or more punches, the products from the web;
using a powered drive mechanism to lower a first car relative to a second car so that extractor elements of the first car are lowered into engagement with the products removed from the web;
using the powered drive mechanism to raise the first car relative to the second car so that the extractor elements are raised so that the products are lifted by the extractor elements; and
shifting at least one of the first car and the second car laterally to move the products away from the molds,
wherein said powered drive mechanism includes:
a linkage that drivingly interconnects the first and second cars to facilitate vertical movement of the first car relative to the second car, and
a motor drivingly engaged with the linkage to power the linkage and shift the first car between a lowered position, in which the extractor elements are positioned to engage products held by the molds, and a raised position, in which the products are lifted by the extractor elements out of engagement with the molds.

17. The method of claim 16,
said linkage including a rotatable driven shaft and a rocker arm mounted on the driven shaft to rotate therewith,
said motor including a drive shaft attached relative to the driven shaft so that rotation of the drive shaft causes corresponding rotation of the driven shaft,
said rocker arm drivingly attached relative to the first car so that rotation of the driven shaft and the rocker arm produces corresponding vertical movement of the first car relative to the second car.

18. The method of claim 17,
one of said first and second cars including an upright slide rail, and the other one of said first and second cars including a bearing slidably engaged with the upright slide rail, with the slide rail and bearing cooperatively permitting relative vertical movement and restricting relative lateral movement between the first and second cars,
said second car being slidably supported by a transport rail comprising opposed transport rails that extend generally parallel to one another, with the first car extending between the opposed transport rails,
said linkage being a first linkage,
said powered drive mechanism including a second linkage that opposes the first linkage,
said first and second linkages located adjacent to respective transport rails and drivingly interconnecting the first and second cars to facilitate vertical movement of the first car relative to the second car.

* * * * *